United States Patent
Yasutomi et al.

(10) Patent No.: US 7,304,729 B2
(45) Date of Patent: Dec. 4, 2007

(54) SURVEY SYSTEM

(75) Inventors: Satoshi Yasutomi, Ashigarakami-gun (JP); Minoru Chiba, Ashigarakami-gun (JP); Nobuyuki Nishita, Ashigarakami-gun (JP)

(73) Assignee: Sokkia Co., Ltd., Atsugi-shi, Kanagawa (JP)

( * ) Notice: Subject to any disclaimer, the term of this patent is extended or adjusted under 35 U.S.C. 154(b) by 22 days.

(21) Appl. No.: 11/348,325

(22) Filed: Feb. 7, 2006

(65) Prior Publication Data

US 2006/0176473 A1   Aug. 10, 2006

(30) Foreign Application Priority Data

Feb. 9, 2005 (JP) .............................. 2005-033639

(51) Int. Cl.
G01B 11/26 (2006.01)

(52) U.S. Cl. .................................. 356/141.3

(58) Field of Classification Search ............. 356/141.3
See application file for complete search history.

(56) References Cited

U.S. PATENT DOCUMENTS

2005/0254044 A1* 11/2005 Sugiura et al. .......... 356/141.1

FOREIGN PATENT DOCUMENTS

| JP | 3075384 | 6/2000 |
| JP | 2000-346645 | 12/2000 |
| JP | 2003-273471 | 9/2003 |
| JP | 2004-144899 | * 5/2004 |

* cited by examiner

Primary Examiner—Thomas H. Tarcza
Assistant Examiner—Luke Ratcliffe
(74) Attorney, Agent, or Firm—Westerman, Hattori, Daniels & Adrian, LLP.

(57) ABSTRACT

A survey system is made up of a target and a surveying instrument provided with an automatic collimator that automatically collimates the target. The target includes a guide light transmitter that emits guide light, an azimuth angle sensor that detects a direction angle (θA, θB) at which the target is directed, and a central processing unit that sends a rotation command, which includes the rotational direction of the instrument body, to the surveying instrument. The central processing unit determines the rotational direction of the instrument body based on an angular difference (θB-θA) between a direction angle (θA) obtained when the target is caused to approximately face the surveying instrument at the last measurement and a direction angle (θB) obtained when the target is caused to approximately face the surveying instrument at the present measurement.

5 Claims, 10 Drawing Sheets

SURVEY SYSTEM

TECHNICAL FIELD

The present invention relates to a survey system that can remotely control a surveying instrument from a target side by a single operator.

BACKGROUND ART

In order to measure the position of a survey point or the like by using a conventional surveying instrument such as a total station (electric distance/angle meter), it was necessary to collimate a target placed at the survey point. In recent years, a surveying instrument having an automatic collimator has appeared on the market in order to reduce labor required to collimate a target and in order to reduce collimation errors committed by an operator. An automatic collimator is a device for determining the direction of a target by emitting a beam of collimation light along the collimation axis (optical axis) of a telescope of the surveying instrument and by receiving the collimation light reflected from the target so as to automatically and accurately direct the telescope toward the target. The surveying instrument having the thus structured automatic collimator has come to include a remote control device so that survey operations can be performed even by a single operator from a location away from the body of the surveying instrument.

However, a conventional problem resides in the fact that, when the surveying instrument having the automatic collimator or the surveying instrument having the remote control device performs a survey in accordance with a command emitted from the remote control device, the telescope must scan a wide range in order to set the target within a narrow visual field of the telescope, and hence much time is consumed for automatic collimation, and the survey cannot be smoothly performed.

Figure 8:
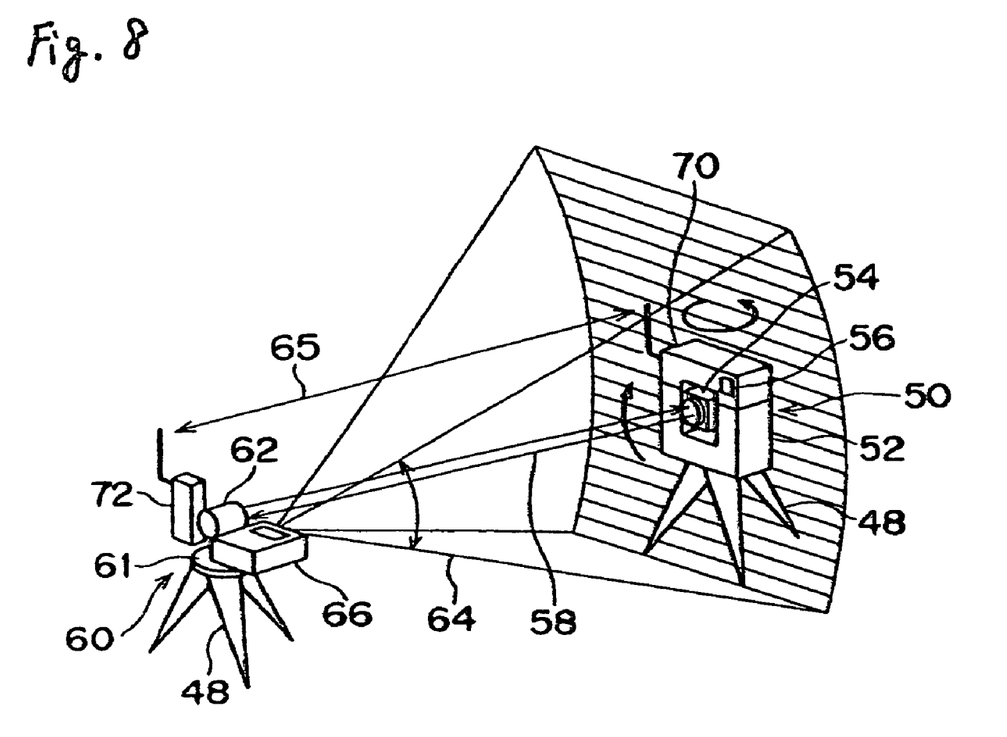
FIG. 8 View showing the outline of the conventional survey system.
Figure 9:
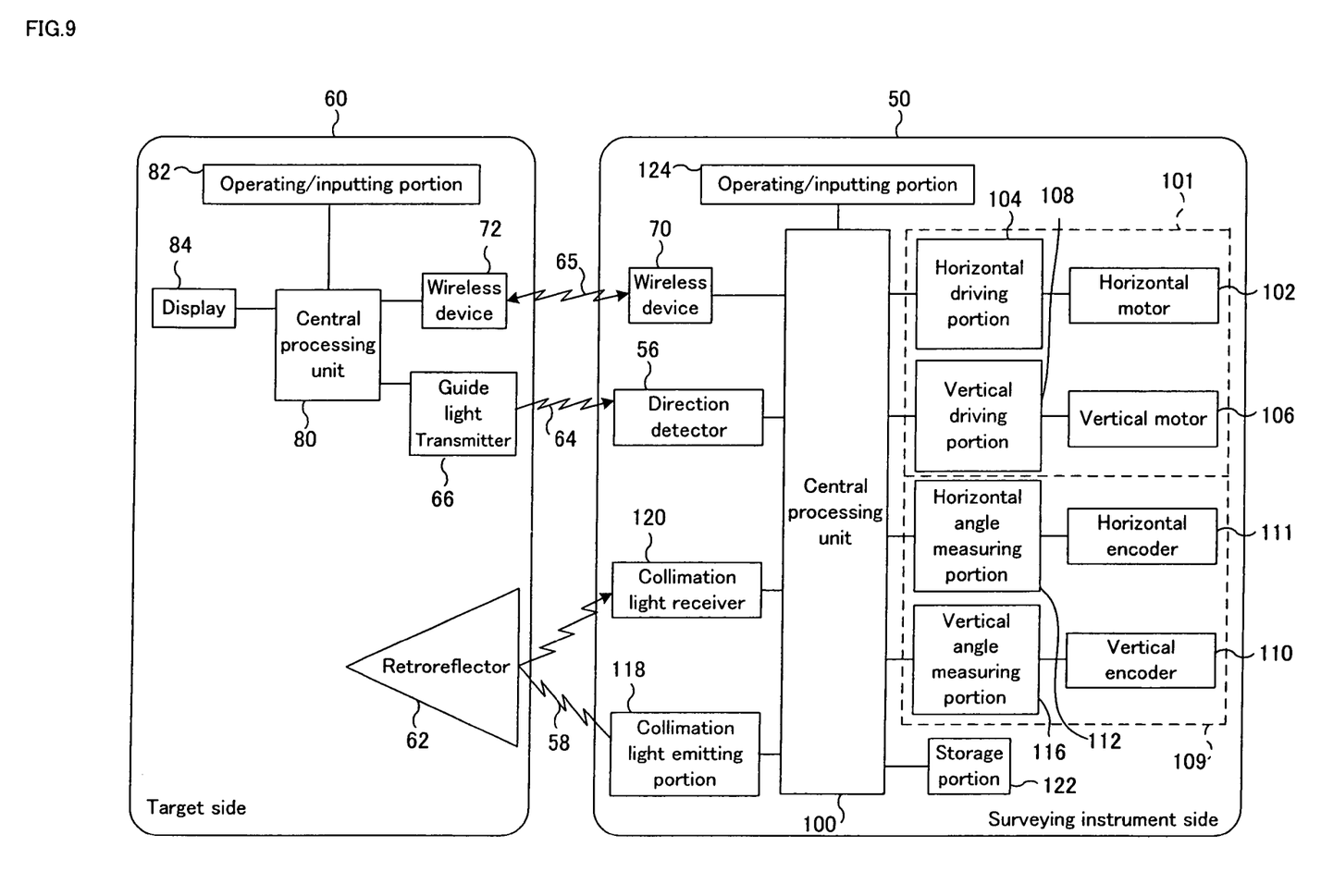
FIG. 9 Block diagram of the whole of the conventional survey system.
Figure 10:
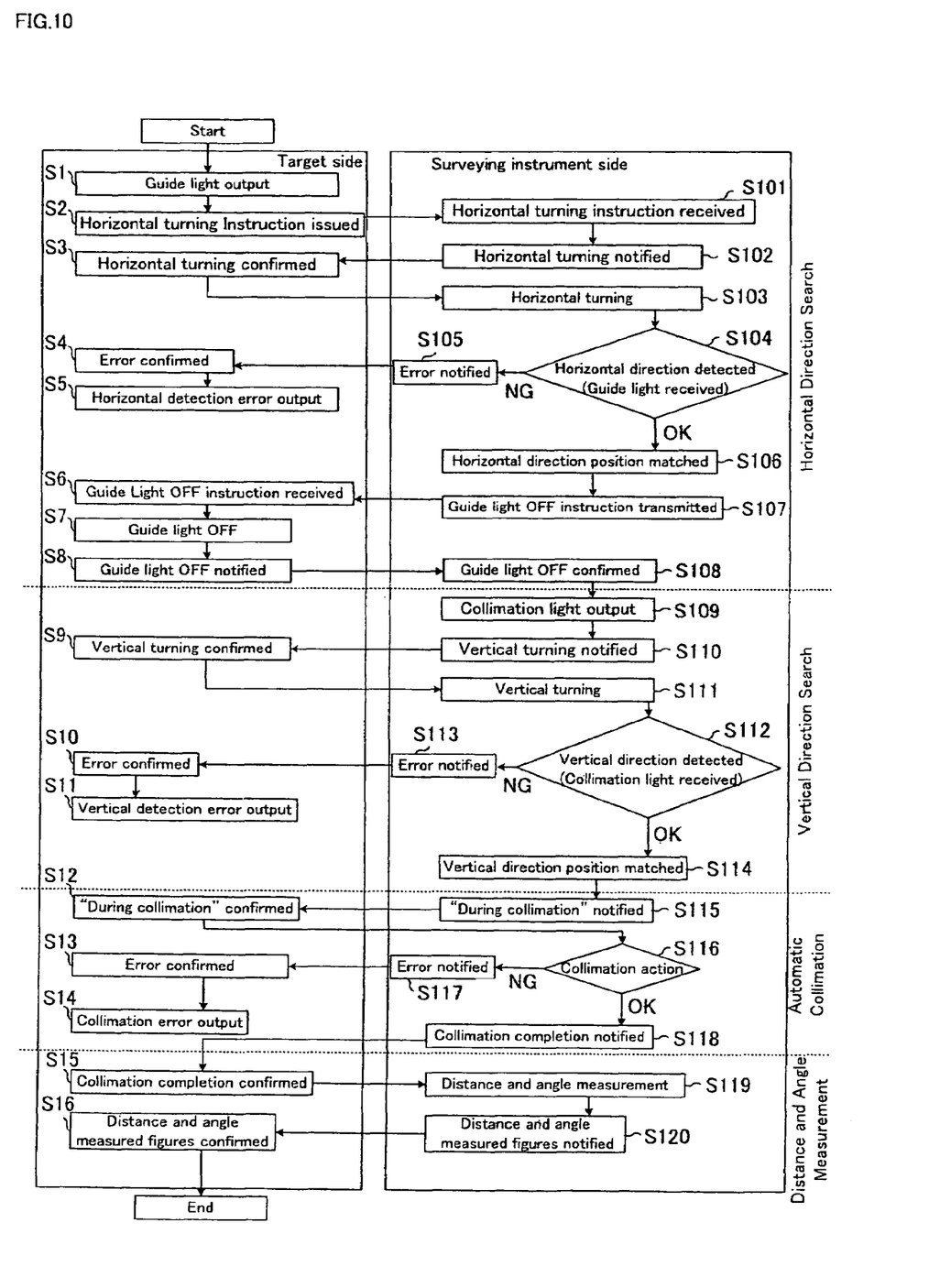
FIG. 10 Flowchart explaining the measuring process of the conventional survey system.

To solve this problem, the present applicant has filed an application concerning a survey system according to which a target is swiftly found by emitting guide light from the target side, and time required for automatic collimation is shortened (see Patent Document 1 mentioned below). FIG. 8 to FIG. 10 show this survey system.

As shown in FIG. 8, the survey system is made up of a surveying instrument 50 having an automatic collimator and a target 60 having a reflecting prism (retro reflector) 62 that reflects rays of light in the direction of the incidence of the rays. The surveying instrument 50 has a horizontally rotatable instrument body 52 provided on a leveling plate (not shown) fixed onto a tripod 48 and a vertically rotatable telescope 54 provided in the instrument body 52. On a leveling plate 61 fixed onto a tripod 48, the target 60 has a reflecting prism 62 that reflects rays of collimation light 58 emitted from the surveying instrument 50 toward the surveying instrument 50 and a guide light transmitter 66 that emits rays of guide light 64 giving information about the direction of the target 60 toward the surveying instrument 50. The guide light 64 is modulated so that the surveying instrument 50 can recognize the guide light 64. Likewise, the collimation light 58 is modulated so that the surveying instrument 50 can recognize the collimation light 58.

The guide light transmitter 66 forms a wide fan beam that is vertically narrow and is horizontally wide. To form the fan beam, light emitted from a light source is diverged by a light transmitting lens that is a cylindrical lens. After that, the guide light transmitter 66 swings in the vertical direction and causes the guide light 64 to scan in the vertical direction.

The instrument body 52 of the surveying instrument 50 has a direction detector 56 that detects the direction of the guide light 64 emitted from the guide light transmitter 66. Since the guide light 64 scans in the vertical direction with a fan beam, the direction detector 56 can detect the direction of the guide light transmitter 66 even when a large difference in height lies between the surveying instrument 50 and the target 60 and even when these two elements do not exactly face each other.

The surveying instrument 50 and the target 60 have wireless devices 70 and 72, respectively, for transmitting command signals and survey results by radio 65 therebetween. The wireless devices 70 and 72 have non-directional antennas, respectively, so that communications can be exchanged even when the surveying instrument 50 and the target 60 do not substantially face each other, and the wireless devices 70 and 72 communicate with each other by radio waves 65.

Referring now to the block diagram of FIG. 9, a description will be given of the respective internal structures of the surveying instrument 50 and the target 60 that constitute the survey system.

The surveying instrument 50 includes a driving portion 101 that directs the telescope 54 toward the reflecting prism 62, a measuring portion 109 that measures a horizontal angle and a vertical angle of the telescope 54, a collimation light emitting portion 118 that emits collimation light 58 toward the reflecting prism 62, a collimation light receiver 120 that receives collimation light 58 reflected by the reflecting prism 62, a storage portion 122 that stores data such as measured angle values, a central processing unit (CPU) 100 connected to the driving portion 101, the collimation light emitting portion 118, the measuring portion 109, the collimation light receiver 120, and the storage portion 122, and a transmitted-light receiving portion (not shown) for calculating the distance between the reflecting prism 62 and the surveying instrument 50. Various commands and data can also be input from an operating/inputting portion 124 to the central processing unit 100.

The driving portion 101 is made up of a horizontal motor 102 that horizontally rotates the instrument body 52, a vertical motor 106 that vertically rotates the telescope 54, and a horizontal driving portion 104 and a vertical driving portion 108 that supply driving current to the motors 102 and 106, respectively. The measuring portion 109 is made up of a horizontal encoder 111 that horizontally rotates together with the instrument body 52, a vertical encoder 110 that vertically rotates together with the telescope 54, a horizontal angle measuring portion 112 and a vertical angle measuring portion 116 that read the rotation angles of the encoders 111 and 110, respectively, and a distance measuring portion (not shown). The distance measuring portion may be either a pulse-type distance measuring system or a phase-difference-type distance measuring system.

The surveying instrument 50 additionally includes an automatic collimator that automatically directs the optical axis (collimation axis) of the telescope 54 toward the reflecting prism 62. The automatic collimator is made up of the central processing unit 100, the collimation light emitting portion 118, the collimation light receiver 120, and the driving portion 101. The automatic collimator emits collimation light 58 from the collimation light emitting portion 118, then receives the collimation light 58 reflected and returned from the reflecting prism 62 by means of the collimation light receiver 120, then determines the direction of the reflecting prism 62 by means of the central processing unit 100, and controls the driving portion 101 so that the optical axis of the telescope 54 can be directed toward the reflecting prism 62. The optical axis of the automatic collimator and the optical axis of the optical system of the distance measuring portion are coaxial.

The surveying instrument 50 additionally has a collimation preparing means for pre-directing the telescope 54 toward the target 60 before starting the automatic collimator. The collimation preparing means is made up of the direction detector 56, the wireless device 70, the driving portion 101, and the central processing unit 100 connected thereto. Based on an output signal emitted from the direction detector 56, the collimation preparing means directs the telescope 54 toward the guide light transmitter 66, and starts automatic collimation when it is determined that the telescope 54 has been directed approximately toward the target 60.

On the other hand, the target 60 has a central processing unit 80 connected to the guide light transmitter 66 and to the wireless device 72, in addition to the reflecting prism 62, the guide light transmitter 66, and the wireless device 72. An operating/inputting portion 82 that inputs various commands and data and a display 84 that displays a state of the target 60 or a state of the surveying instrument 50 are connected to the central processing unit 80.

Referring now to FIG. 10, a description will be given of a measuring process in the survey system.

When the survey system is started, the process proceeds to step S1, at which the target 60 emits guide light 64 from the guide light transmitter 66. The process then proceeds to step S2, at which a horizontal rotation command signal to horizontally rotate the instrument body 52 is transmitted to the surveying instrument 50. The surveying instrument 50 then receives the horizontal rotation command signal at step S101. The process then proceeds to step S102, at which a horizontal rotation starting notice is transmitted to the target 60. The target 60 confirms the horizontal rotation of the instrument body 52 at step S3, and thereby knows that the surveying instrument 50 has started the horizontal search of the guide light 64.

On the other hand, on the side of the surveying instrument 50, the process proceeds to step S103, at which the instrument body 52 is horizontally rotated. The process then proceeds to step S104, at which the horizontal direction of the target 60 is detected by receiving the guide light 64. If the guide light 64 cannot be received in predetermined time here, the process proceeds to step S105, at which an error notice is transmitted to the target 60. After the target 60 receives the error notice at step S4, the process proceeds to step S5, at which the target 60 causes the display 84 to display a horizontal detection error, and is stopped.

If the guide light 64 is received at step S104, the process proceeds to step S106, at which the horizontal position of the telescope 54 is adjusted toward the guide light transmitter 66, and the horizontal rotation of the instrument body 52 is stopped. The process then proceeds to step S107, at which a guide light OFF command is transmitted to the target 60. When the guide light OFF command is received at step S6, the target 60 recognizes that the horizontal search of the guide light transmitter 66 has been completed in the surveying instrument 50, and therefore the process proceeds to step S7, at which the guide light 64 is turned off. The process then proceeds to step S8, at which the guide light OFF notice is transmitted to the surveying instrument 50.

If the surveying instrument 50 confirms the guide light OFF notice at step S108, the process proceeds to step S109, at which collimation light 58 is emitted. The process then proceeds to step S110, at which the notice of starting the vertical rotation of the telescope 54 is transmitted to the target 60. The vertical rotation notice is confirmed at step S9, and thereby the target 60 recognizes that the surveying instrument 50 has started the vertical search of the target 60. On the other hand, on the side of the surveying instrument, the process proceeds to step S111, at which the telescope 54 is vertically rotated, and the vertical search of the target 60 is continued.

The process then proceeds to step S112, at which the surveying instrument 50 emits collimation light 58, and the collimation light 58 reflected and returned from the target 60 is received, whereby the vertical direction of the target 60 is detected. If the collimation light 58 cannot be received here, the process returns to step S101, at which a flow procedure is repeated, or the process proceeds to step S113, at which an error notice is transmitted to the target 60. If the target 60 confirms the error notice at step S10, the process proceeds to step S11, at which the target 60 causes the display 84 to display a vertical direction detecting error, and is stopped.

If the collimation light 58 is received at step S112, the process proceeds to step S114, at which the telescope 54 is adjusted at the vertical position of the target 60, and the telescope 54 is stopped. The process then proceeds to step S115, at which a collimating operation is started, and a notice to the effect that a collimating operation is being carried out is transmitted to the target 60. The target 60 confirms that a collimating operation is being carried out at step S12, whereby the surveying instrument 50 recognizes that the automatic collimator has been started. On the other hand, on the side of the surveying instrument 50, the process proceeds to step S116, at which the automatic collimating operation is continued.

If the collimating operation cannot be satisfactorily collimated out at step S116, the process proceeds to step S117, at which an error notice is transmitted to the target 60. If the target 60 confirms the error notice at step S13, the process proceeds to step S14, at which the target 60 causes the display 84 to display a collimation error, and is stopped. If the collimating operation is satisfactorily collimated out at step S116, the process proceeds to step S118, at which a collimation completion notice is transmitted to the target 60. As a result, the target 60 recognizes that automatic collimation has been completed in the surveying instrument 50 at step S15.

The process then proceeds to step S119, at which the surveying instrument 50 performs distance and angle measuring operations. The process then proceeds to step S120, at which measured distance and angle values are transmitted to the target 60. The target 60 confirms the measured distance and angle values at step S16, and then causes the display 84 to display the survey results of the measured distance and angle values and other results, and the survey is ended.

In a case in which the errors are displayed on the display 84, and operations are stopped by these errors, it is recommended to remove the causes of the errors and then re-start the operation of the survey system.

According to this survey system, since the fan-shaped beam of guide light 64 is emitted from the side of the target 60 while scanning, the guide light 64 having adequate intensity can be emitted to a large range with less electric power, and the surveying instrument 50 can swiftly find the target 60, so that time required to complete automatic collimation can be shortened.

[Patent Document 1] Japanese Patent Application No. 2004-023614

DISCLOSURE OF INVENTION

[Problems to be Solved by the Invention]

However, even in the surveying instrument 50 disclosed in the application mentioned above, a conventional problem resides in the fact that, if a proper command is not given as to whether the instrument body 52 is first rotated clockwise or counterclockwise, a case will arise in which the target 60 is finally caught by rotating the instrument body 52 by approximately 360 degrees if circumstances require, and time required for automatic collimation cannot be sufficiently shortened although the target 60 can be swiftly caught by slightly rotating the instrument body 52 in ordinary cases. This problem can be easily solved by attaching a button used to indicate its rotational direction to the target 60 and by allowing an operator to indicate the rotational direction of the instrument body 52. However, this solution causes the problem of increasing a burden imposed on the operator.

The present invention has been made in consideration of the foregoing problem, and it is an object of the present invention to provide a surveying instrument capable of shortening time required for automatic collimation as much as possible without increasing a burden imposed on an operator, although the surveying instrument has already been capable of swiftly finding the target and capable of shortening time required for automatic collimation as much as possible by emitting guide light from the target side.

[Means for Solving the Problem]

To achieve the object, the invention according to Claim 1 is characterized in that a survey system comprises a target and a surveying instrument including an automatic collimator that automatically collimates the target, and the target comprises a guide light transmitter that emits guide light, an azimuth angle sensor that detects a direction angle at which the target is directed, and a rotation command means for sending a rotation command to the surveying instrument, and the surveying instrument comprises a rotation means for directing a body of the surveying instrument toward the target by receiving the guide light when the rotation command is received, and the rotation command means or the rotation means determines a rotational direction of the body of the surveying instrument based on an angular difference between a direction angle obtained when the target is caused to substantially exactly face the surveying instrument at the last measurement and a direction angle obtained when the target is caused to substantially exactly face the surveying instrument at the present measurement.

The invention according to Claim 2 is characterized in that, in the invention according to Claim 1, the rotation command means or the rotation means determines the rotation angle of the body of the surveying instrument to be the angular difference.

The invention according to Claim 3 is characterized in that, in the invention according to Claim 1, the rotation command means or the rotation means rotates the body of the surveying instrument in a rotational direction determined based on the angular difference if the angular difference is greater than a maximum estimated error angle of the azimuth angle sensor, and the rotation command means or the rotation means determines an excessive angle that is greater by the maximum estimated error angle than the angular difference, then rotates the body of the surveying instrument by the excessive angle, and reverses the body of the surveying instrument if the angular difference is smaller than the maximum estimated error angle.

The invention according to Claim 4 is characterized in that, in the invention according to Claim 1, if an angular difference of the direction angle is greater than the sum of the maximum estimated error angle of the azimuth angle sensor and a safe error angle obtained by affording a margin for the error angle, the rotation command means or the rotation means rotates the body of the surveying instrument in a rotational direction determined based on the angular difference, and, if the angular difference of the direction angle is greater than the maximum estimated error angle and is smaller than the sum of the maximum estimated error angle and the safe error angle, the rotation command means or the rotation means determines an excessive angle greater by the sum of the maximum estimated error angle and the safe error angle than the angular difference, then rotates the body of the surveying instrument by the excessive angle, and reverses the body of the surveying instrument, and, if the angular difference of the direction angle is smaller than the maximum estimated error angle, the rotation command means or the rotation means determines an excessive angle greater by the maximum estimated error angle than the angular difference and a return angle equal to the sum of twice the maximum estimated error angle and the safe error angle, then rotates the body of the surveying instrument by the excessive angle, then reverses the body of the surveying instrument by the return angle, and again rotates the body of the surveying instrument in the direction determined first.

The invention according to Claim 5 is characterized in that, in the invention according to any one of Claims 1, 2, 3, and 4, the azimuth angle sensor is a magnetic sensor.

[Effects of the Invention]

According to the invention of Claim 1, the rotation command means or the rotation means determines a rotational direction of the body of the surveying instrument based on an angular difference between a direction angle obtained when the target is caused to substantially exactly face the surveying instrument at the last measurement and a direction angle obtained when the target is caused to substantially exactly face the surveying instrument at the present measurement. Therefore, the instrument body can automatically determine a rotational direction appropriate for catching guide light emitted from the target by a minimum rotation angle without imposing a burden on an operator, and the time required for automatic collimation can be shortened as much as possible without increasing a burden imposed on the operator, thus making it possible to improve working efficiency.

According to the invention of Claim 2, the rotation command means or the rotation means determines the rotation angle of the body of the surveying instrument to be the angular difference. Therefore, a case never occurs in which the surveying instrument fails to catch guide light emitted from the target because of the influence of, for example, noise, so that the instrument body is excessively rotated, and hence the time taken until the guide light emitted from the target is caught is prevented from becoming long.

According to the invention of Claim 3, the rotation command means or the rotation means rotates the body of the surveying instrument in a rotational direction determined based on the angular difference if the angular difference is greater than a maximum estimated error angle of the azimuth angle sensor, and the rotation command means or the rotation means determines an excessive angle that is greater by the maximum estimated error angle than the angular difference, then rotates the body of the surveying instrument by the excessive angle, and reverses the body of the surveying instrument if the angular difference of the direction angle is smaller than the maximum estimated error angle. Therefore, the guide light emitted from the target can be caught by rotating the instrument body by an appropriate rotational pattern in accordance with the angular difference, and automatic collimation can be reliably performed in a shorter time.

According to the invention of Claim 4, if an angular difference of the direction angle is greater than the sum of the maximum estimated error angle of the azimuth angle sensor and a safe error angle obtained by affording a margin for the error angle, the rotation command means or the rotation means rotates the body of the surveying instrument in a rotational direction determined based on the angular difference, and, if the angular difference of the direction angle is greater than the maximum estimated error angle and is smaller than the sum of the maximum estimated error angle and the safe error angle, the rotation command means or the rotation means determines an excessive angle greater by the sum of the maximum estimated error angle and the safe error angle than the angular difference, then rotates the body of the surveying instrument by the excessive angle, and reverses the body of the surveying instrument, and, if the angular difference of the direction angle is smaller than the maximum estimated error angle, the rotation command means or the rotation means determines an excessive angle greater by the maximum estimated error angle than the angular difference and a return angle equal to the sum of twice the maximum estimated error angle and the safe error angle, then rotates the body of the surveying instrument by the excessive angle, then reverses the body of the surveying instrument by the return angle, and again rotates the body of the surveying instrument in the direction determined first. Therefore, the guide light emitted from the target can be caught by rotating the instrument body by an appropriate rotational pattern in accordance with the angular difference, and automatic collimation can be reliably performed in a shorter time.

According to the invention of Claim 5, the azimuth angle sensor is a magnetic sensor. Therefore, the present invention can be easily realized at low cost.

[Best Mode for Carrying Out the Invention]

Embodiments of the present invention will be hereinafter described in detail with reference to the accompanying drawings.

Figure 1:
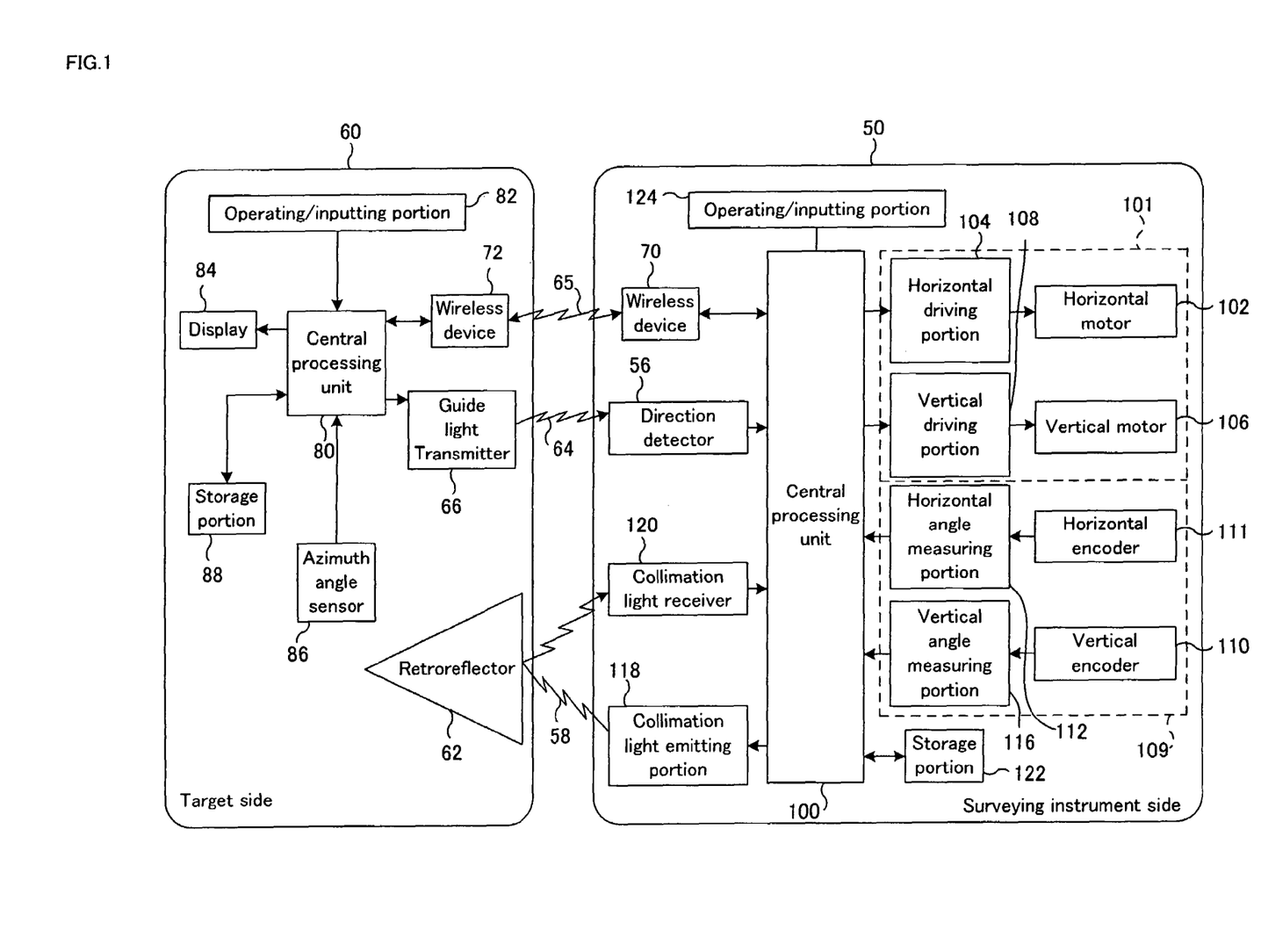
FIG. 1 Block diagram of the whole of the survey system according to the first embodiment of the present invention.
Figure 2:
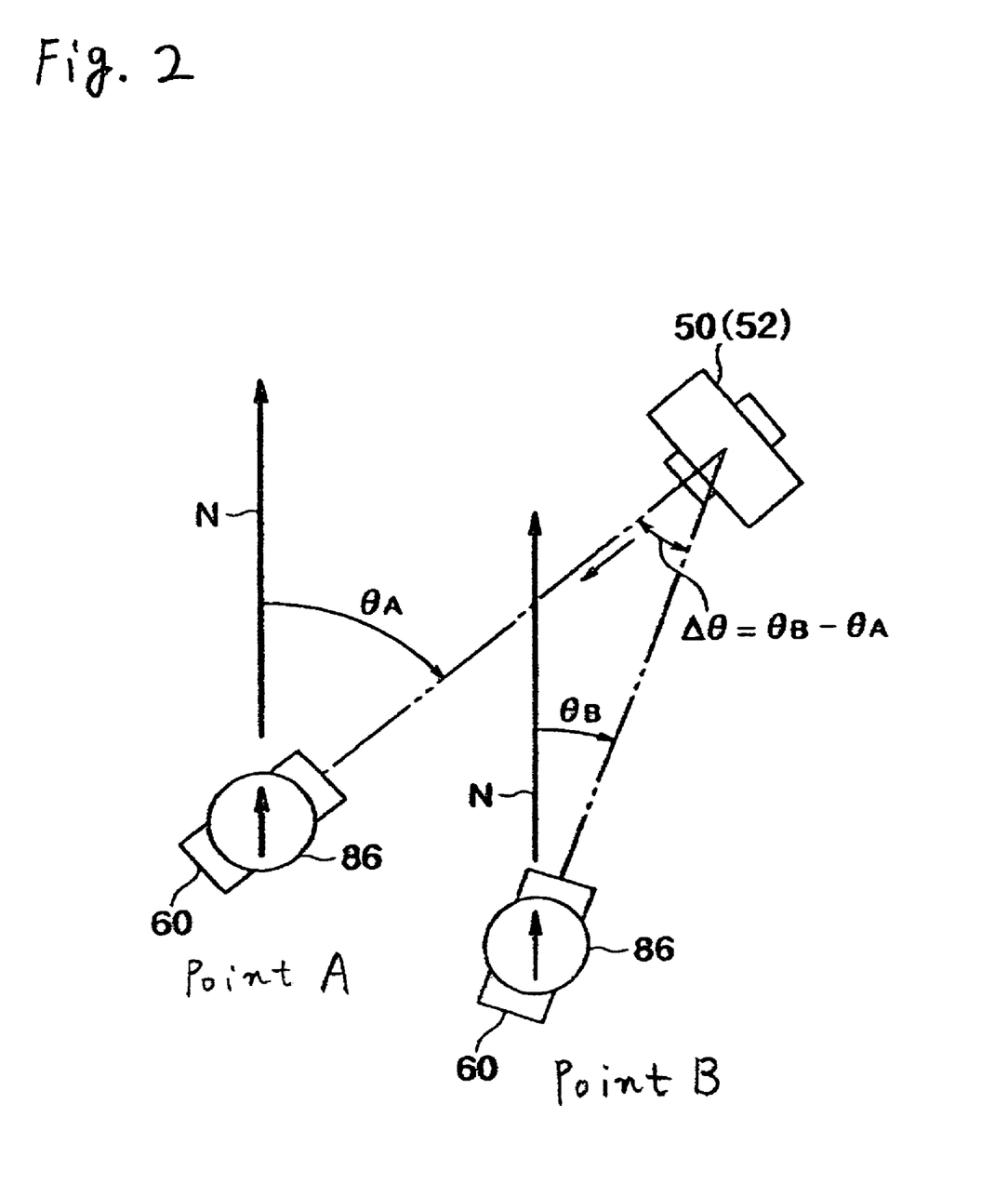
FIG. 2 View for explaining the principle of the survey system.
Figure 3:
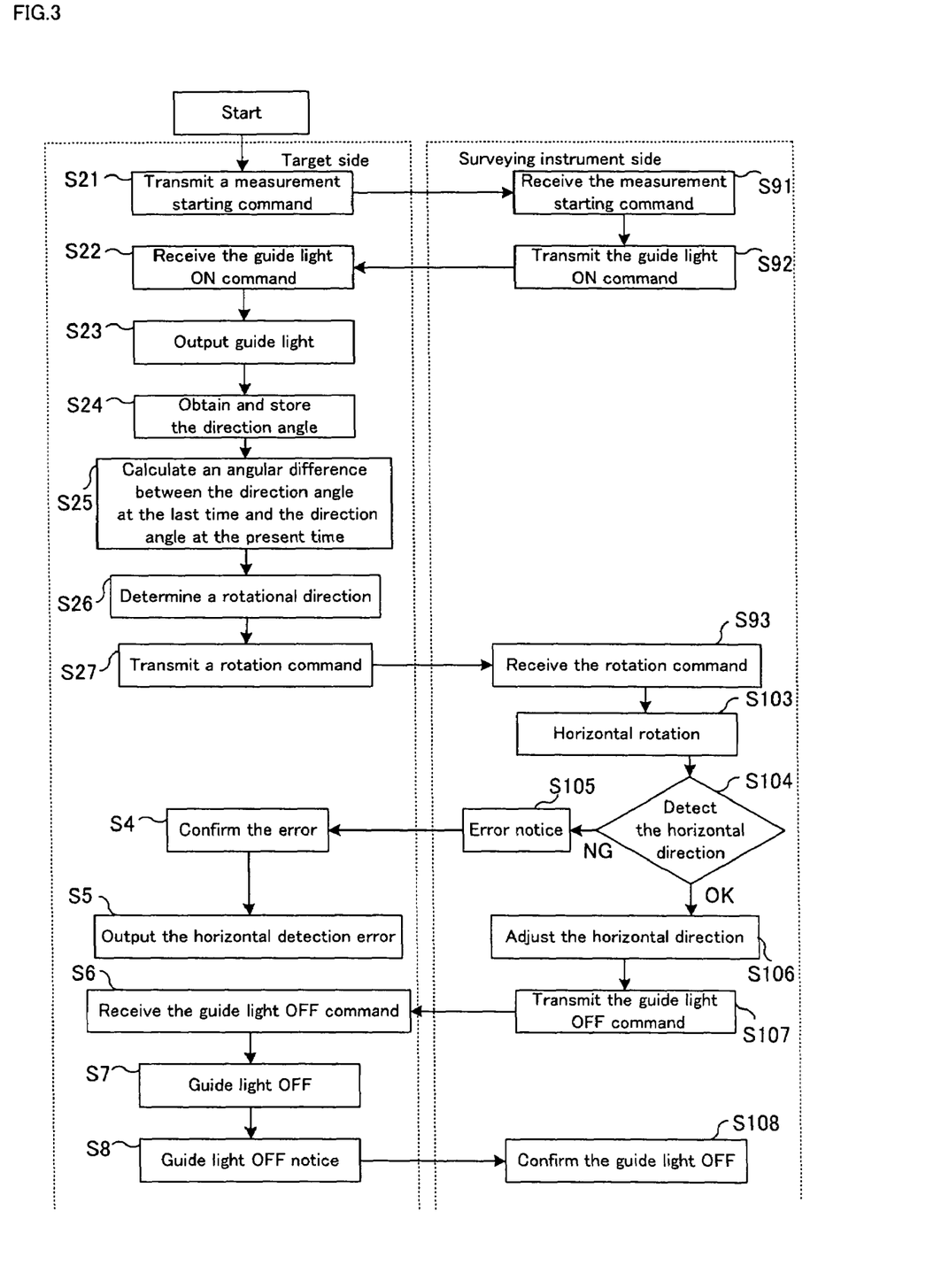
FIG. 3 Flowchart explaining a process for positionally adjusting the instrument body approximately toward the target in the survey system.

First, a first embodiment of the present invention will be described with reference to FIG. 1 to FIG. 3. FIG. 1 is a block diagram of the whole of a survey system according to this embodiment. FIG. 2 is a view for explaining the principle of the present invention. FIG. 3 is a flowchart explaining a process for adjusting the body of a surveying instrument approximately toward a target in this survey system.

As shown in FIG. 1, the survey system has a target 60 including a guide light transmitter 66, an azimuth angle sensor 86 that measures the direction of the target 60, and a storage portion 88 that stores a direction angle (azimuth angle) measured by the azimuth angle sensor 86. A central processing unit (CPU) 80 is connected to the azimuth angle sensor 86 and the storage portion 88. The central processing unit (CPU) 80 causes the azimuth angle sensor 86 to measure a direction angle and causes the storage portion 88 to store this direction angle every time the distance and angle are measured by moving the target 60. When the distance and angle begin to be measured, the central processing unit 80 calculates an angular difference $\theta B-\theta A$ between a direction angle $\theta A$ obtained at the last measurement and a direction angle $\theta B$ obtained at the present measurement, then determines the rotational direction of an instrument body 52 in accordance with the angular difference $\theta B-\theta A$, and transmits a horizontal rotation command signal, which includes this rotational direction, to the surveying instrument 50 by radio 65.

A magnetic sensor that outputs a direction angle by detecting terrestrial magnetism is used as the azimuth angle sensor 86. The direction angle is measured by a clockwise angle based on the magnetic north. An example of such a magnetic sensor is disclosed in Japanese Unexamined Patent Application Publication No. H9-329441 filed by the present applicant. Instead, an azimuth angle sensor using a hall device may be used. Excluding this, the survey system is identical in structure with the conventional survey system shown in FIG. 6. Therefore, overlapping description of the structure of this survey system is omitted.

Referring to FIG. 2, the principle of the present invention will be described. When an operator measures the distance or the angle while causing the target 60 to substantially exactly face the surveying instrument 50 at point "A," the central processing unit 80 causes the azimuth angle sensor 86 to read a direction angle $\theta A$ that the guide light transmitter 66 makes with the direction N of the magnetic north, and causes the storage portion 88 to store the direction angle $\theta A$. When the measurement is completed at point "A," and the target 60 is moved to point "B," the target 60 is again caused to substantially exactly face the surveying instrument 50, and the measurement is started. At this time, the central processing unit 80 again causes the azimuth angle sensor 86 to read the direction angle $\theta B$ of the guide light transmitter 66, and calculates an angular difference $\Delta\theta=\theta B-\theta A$ between the direction angle $\theta A$ at point "A" at the last measurement and the direction angle $\theta B$ at point "B" at the present measurement. Since this angular difference $\Delta\theta$ is a change in the direction angle of the surveying instrument 50 when viewed from the target 60, the instrument body 52 comes to substantially exactly face the target 60 placed at point "B" by rotating the instrument body 52 by this angular difference $\Delta\theta$ in the opposite direction.

Therefore, when this angular difference $\Delta\theta=\theta B-\theta A$ is in the relation $-180°\leq\Delta\theta<0°$ or $180°\leq\Delta\theta<360°$, a rotation command signal including a counterclockwise rotational direction is transmitted from the target to the surveying instrument 50, and, when this angular difference $\Delta\theta=\theta B-\theta A$ is in the relation $0°\leq\Delta\theta<180°$ or $-360°\leq\Delta\theta<-180°$, a rotation command signal including a clockwise rotational direction is transmitted from the target to the surveying instrument 50, whereby the instrument body 52 is rotated in a specified direction. Accordingly, an appropriate rotational direction can be automatically determined with respect to the instrument body 52 without imposing a burden on the operator, and the guide light transmitter 66 can always be caught by a minimum rotation angle within 180°. Therefore, working efficiency can be improved.

If the angular difference $\Delta\theta$ is near ±0°, the guide light 66 can be caught without the rotation of the instrument body, and, if the angular difference $\Delta\theta$ is near ±180°, the time taken until the guide light transmitter 66 is caught becomes almost the same in spite of the clockwise or counterclockwise rotation. Therefore, the azimuth angle sensor 86 is not required to be so accurate, and there is no need to cause the target 60 to exactly face the surveying instrument 50 when measured. Therefore, it is permissible to cause the target 60 to roughly face the surveying instrument 50.

A description will now be given of the measuring process of the survey system with reference to the flowchart of FIG. 3.

When this survey system is started, the process proceeds to step S21, at which the target 60 sends a measurement starting command to the surveying instrument 50. When the surveying instrument 50 receives the measurement starting command, the process proceeds to step S91, at which a guide light ON command is transmitted to the target 60. When the target 60 receives the guide light ON command at step S22, the process proceeds to step S23, at which guide light 64 is output from the guide light transmitter 66. The process then proceeds to step S24, at which the target 60 obtains a direction angle θB from the azimuth angle sensor 86, and the direction angle θB is stored in the storage portion 88. The process then proceeds to step S25, at which the target 60 calculates an angular difference between the direction angle θB obtained at the present measurement and the direction angle θA obtained at the last measurement. The process then proceeds to step S26, at which a rotational direction indicated to the surveying instrument 50 is determined. The process then proceeds to step S27, at which a horizontal rotation command including the rotational direction is transmitted to the surveying instrument 50. Herein, steps S24 to S27 executed by the central processing unit 80 correspond to the rotation command means of the present invention.

When the surveying instrument 50 receives the horizontal rotation command at step S93, the process proceeds to step S103, at which the instrument body 52 is horizontally rotated. The process then proceeds to step S104, at which the guide light 64 is detected, and thereby the horizontal direction of the target 60 is detected. If the guide light 64 cannot be received in predetermined time here, the process proceeds to step S105, at which an error notice is transmitted to the target 60. When the target 60 confirms the error notice at step S4, the process proceeds to step S5, at which a horizontal detection error is displayed on the display 84, and the operations are stopped. When the guide light 64 is received at step S104, it is determined that the horizontal direction of the target 60 has been detected. The process then proceeds to step S106, at which the horizontal position of the telescope 54 is adjusted toward the guide light transmitter 66, and the horizontal rotation of the instrument body 52 is stopped. Herein, steps S93 to S106 executed by the central processing unit 100, the direction detector 56, the horizontal driving portion 104, and the horizontal motor 102 correspond to the rotation means of the present invention. Since steps subsequent to this are the same as the conventional ones shown in FIG. 8, a description thereof is omitted. In a case in which the horizontal detection error is displayed on the display 84, and the operations are stopped, it is recommended to first remove the cause of the error, and then re-start the operation of the survey system.

According to this embodiment, since the guide light 64 is a fan beam that is wide in the horizontal direction and that is narrow in the vertical width, the guide light 64 can reach a distant place, and, since the guide light 64 is caused to scan in the vertical direction and is projected onto a wide range from side to side and up and down, the direction detector 56 mounted on the surveying instrument 50 can reliably receive the guide light 64 and can reliably perform collimation preparations for pre-directing the telescope 54 approximately in the direction of the target 60 before starting automatic collimation regardless of a large vertical interval between the surveying instrument 50 and the target 60 even if the surveying instrument 50 and the target 60 do not exactly face each other. Moreover, an appropriate rotational direction can be automatically indicated from the target 60 to the surveying instrument 50 in addition to transmitting the guide light 64, and the instrument body 52 can always receive the guide light 64 by the minimum horizontal rotation within 180°. Thus, an appropriate rotational direction of the instrument body 52 is automatically determined and is given to the surveying instrument 50. Therefore, working efficiency can be improved without imposing a burden on an operator.

A second embodiment will now be described. A survey system in this embodiment has the same structure as in the first embodiment shown in FIG. 1, but differs in the process for positionally adjusting the instrument body 52 toward the target 60. This process will be hereinafter described with reference to FIG. 4 and FIG. 5.

Figure 4:
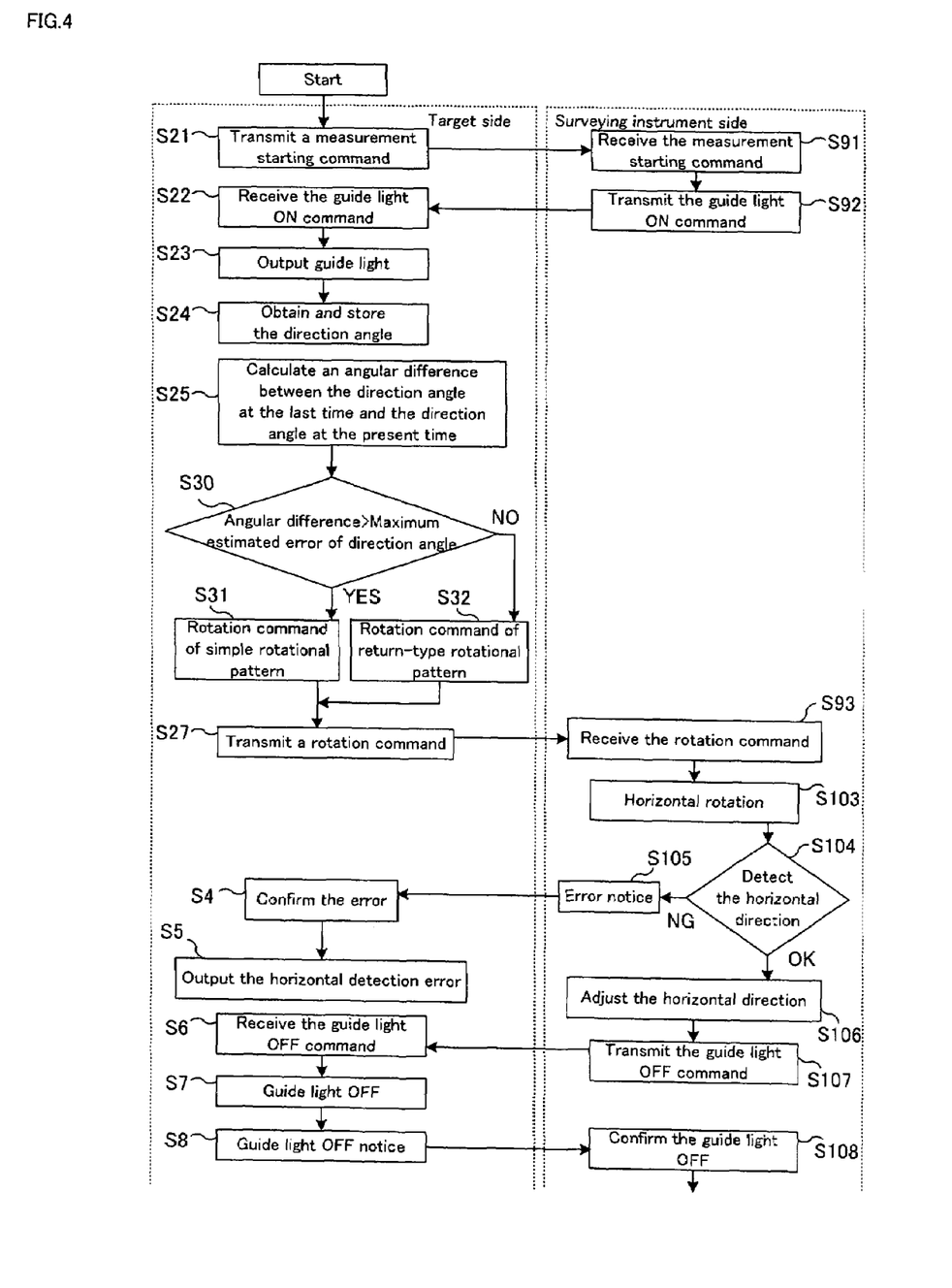
FIG. 4 Flowchart explaining a process for positionally adjusting the instrument body approximately toward the target in the survey system according to the second embodiment of the present invention.

As shown in FIG. 4, after starting the survey system, the process proceeds to step S25, at which the target 60 calculates an angular difference $\Delta\theta=\theta B-\theta A$ between the direction angle θB obtained at the present measurement and the direction angle θA obtained at the last measurement in the same way as in the first embodiment.

Figure 5:
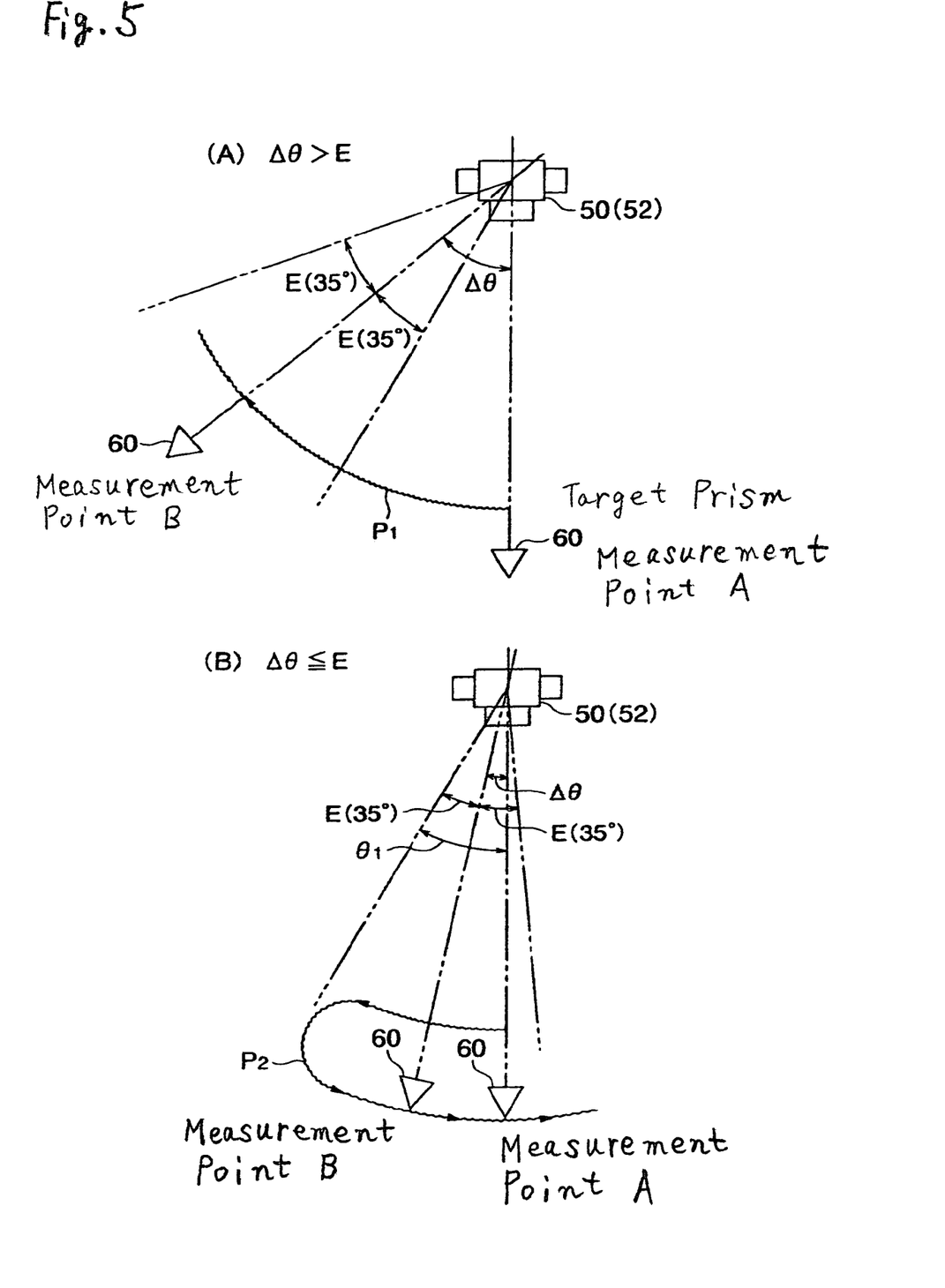
FIG. 5 View for explaining a rotational pattern by which the instrument body is rotated in the survey system according to the second embodiment.

The process then proceeds to step S30, at which a comparison as to whether it is greater or smaller is made between the angular difference Δθ between the direction angle θB obtained at the present measurement and the direction angle θA obtained at the last measurement and the maximum estimated error E of the azimuth angle sensor 86. When a magnetic sensor is used as the azimuth angle sensor 86, the maximum estimated error E is estimated at about 30° or less, in consideration of a situation in which a structure made of magnetic materials or the like exists near the sensor. Besides this, when an operator causes the target 60 to exactly face the surveying instrument 50, there is a possibility that the error of about 5° at its maximum will occur. For this reason, it is normal to estimate the maximum estimated error E at about 35°. Therefore, if an angular difference between direction angles at measurement points "A" and "B" is represented as Δθ when the target 60 is moved from measurement point "A" to measurement point "B" as shown in FIG. 5, the guide light 64 can be reliably detected by rotating the instrument body 52 so as to search the guide light 64 within the range of Δθ±E, i.e., Δθ±35°. The maximum estimated error E may be, of course, increased or decreased in a suitable manner according to, for example, an external environment.

If Δθ>E at step S30, the process proceeds to step S31, at which the rotational direction of the instrument body 52 is determined in the same way as in the first embodiment as shown in FIG. 5(A), and a rotation command of a rotational pattern P1 by which the instrument body 52 is simply rotated in an indicated rotational direction is formed. This rotational pattern P1 makes it possible to cover Δθ±E, which is an error range of Δθ, swiftly and reliably.

If Δθ≦E at step S30, the process proceeds to step S32, at which the rotational direction of the instrument body 52 is determined as shown in FIG. 5(B), and an excessive angle $\theta 1=\Delta\theta+E$, which is greater by the maximum estimated error E than the angular difference Δθ, is determined, and a rotation command of a return-type rotational pattern P2, by which the instrument body 52 is first rotated by the excessive angle θ1, is then reversed by the return angle θ2, and continues to be rotated in the same direction without changes, is formed. This rotational pattern P2 makes it possible to cover Δθ±E, which is an error range of Δθ, swiftly and reliably. Especially when the instrument body 52 is rotated in an incorrect direction because of the error of Δθ, the guide light 64 can be swiftly and reliably caught by the minimum rotation angle of the instrument body 52.

When the rotation commands are formed in this way, the process proceeds to step S27, at which a rotation command is transmitted from the target 60 to the surveying instrument 50. Herein, on the side of the surveying instrument 50, steps S24, S25, S30 to S32, and S27 executed by the central processing unit 80 correspond to the rotation command means of the present invention.

When the surveying instrument 50 receives a horizontal rotation command at step S93, the process proceeds to step S103, at which the instrument body 52 is horizontally rotated. The process then proceeds to step S104, at which the guide light 64 is detected, and the horizontal direction of the target 60 is detected. Since steps subsequent to this are the same as the conventional ones shown in FIG. 3, a description thereof is omitted.

According to this embodiment, if the angular difference $\Delta\theta$ is greater than the maximum estimated error angle E of the azimuth angle sensor 86, the rotational pattern P1 is selected, and, if the angular difference $\Delta\theta$ is smaller than the maximum estimated error E, the return-type rotational pattern P2 is selected. Additionally, the instrument body 52 is rotated by an appropriate rotational pattern in accordance with the angular difference $\Delta\theta$, and the guide light 64 emitted from the target 60 is caught swiftly and reliably. Therefore, the appropriate rotational direction of the instrument body 52 can be automatically determined and be given to the surveying instrument 50 without increasing the burden imposed on an operator, and working efficiency can be heightened.

Figure 6:
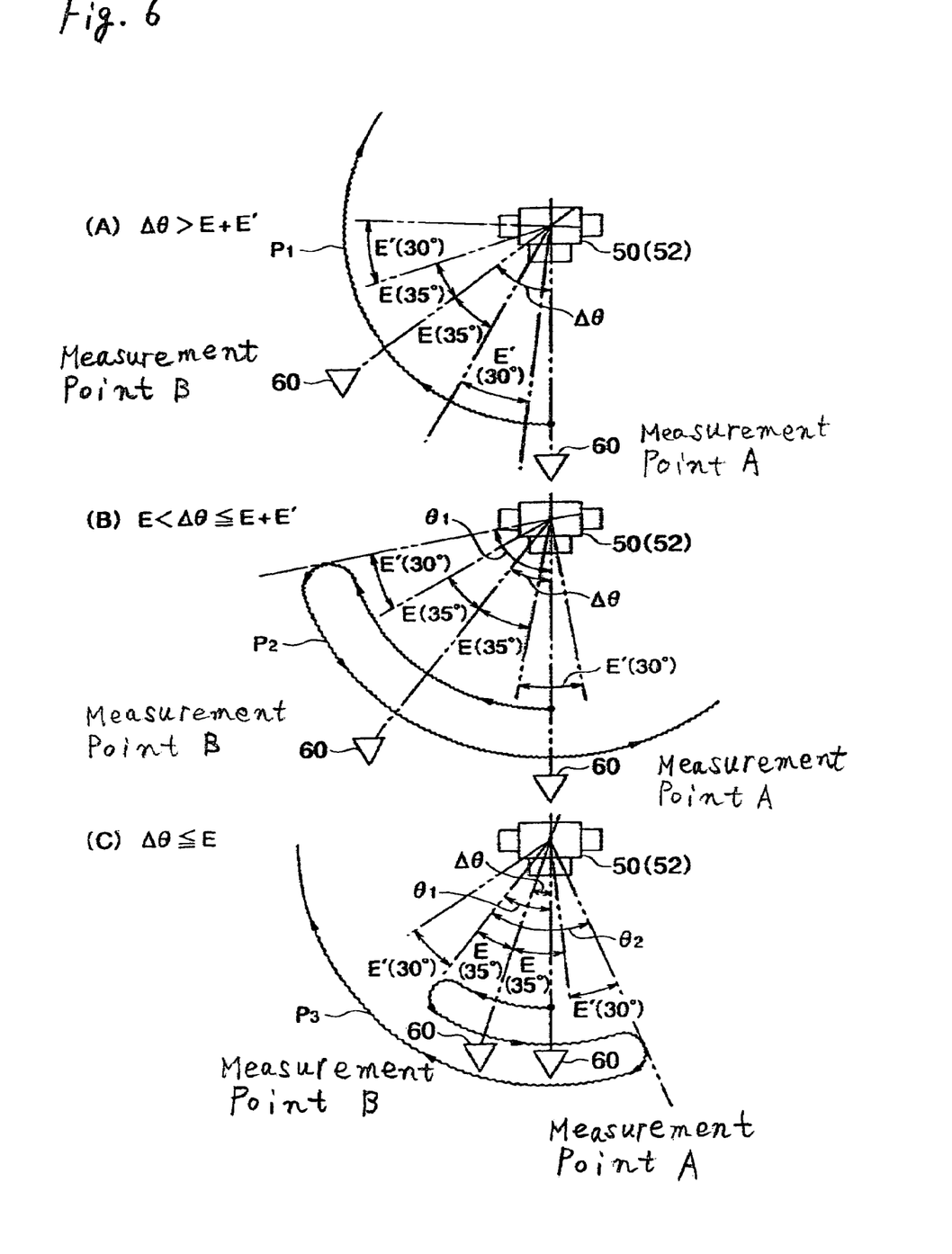
FIG. 6 View for explaining a rotational pattern by which the instrument body is rotated in the survey system according to the third embodiment of the present invention.

A third embodiment will now be described with reference to FIG. 6 and FIG. 7. A survey system of this embodiment is formed by improving that of the second embodiment. As shown in FIG. 6, as the maximum error range in which the target 60 that has been moved is placed, a safe error angle E obtained by affording a margin for the error angle is set outside a normally expected maximum estimated error angle E', in order to further increase the reliability of the capture of the target 60. Normally, the safe error angle E' is set at about 30°. The safe error angle E' may be, of course, increased or decreased in a suitable manner according to, for example, an external environment.

Figure 7:
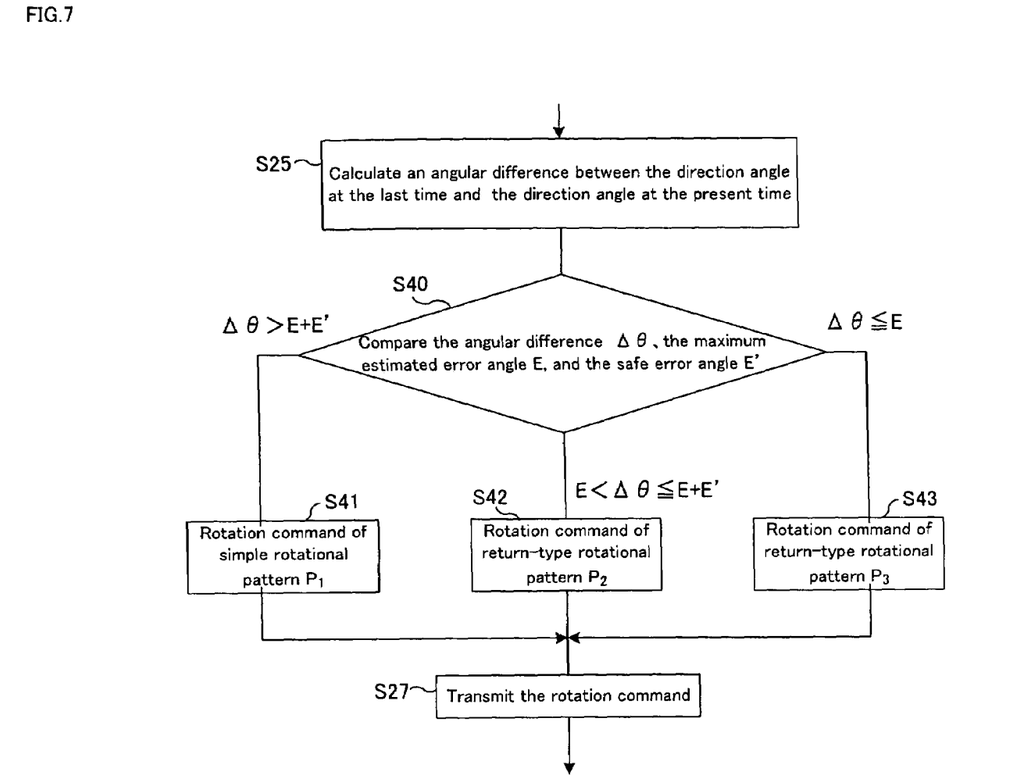
FIG. 7 Flowchart explaining a process for positionally adjusting the instrument body approximately toward the target in the survey system according to the third embodiment.

In the flowchart of FIG. 7, an angular difference $\Delta\theta$ between the direction angle $\theta B$ obtained at the present time and the direction angle $\theta A$ obtained at the last time is calculated at step S25 in the same way as in the second embodiment shown in FIG. 4. However, in this embodiment, the process then proceeds to step S40, at which a comparison is made among the angular difference $\Delta\theta$, the maximum estimated error angle E and the safe error angle E'.

If $E+E'<\Delta\theta$ among the angular difference $\Delta\theta$ between the direction angle $\theta B$ obtained at the present time and the direction angle $\theta A$ obtained at the last time, the maximum estimated error angle E and the safe error angle E', the process proceeds to step S41, at which the rotational direction of the instrument body 52 is determined in the same way as in the first embodiment, and a rotation command of a rotational pattern P1 by which the instrument body 52 is simply rotated in an indicated rotational direction is formed (see FIG. 6(A)).

If $E<\Delta\theta\leq E+E'$, the process proceeds to step S42, at which the excessive angle $\theta 1$ is determined as $\theta 1=\Delta\theta+E+E'$, and a rotation command of a return-type rotational pattern P2, by which the instrument body 52 is rotated by the excessive angle $\theta 1$, and continues to be reversed (see FIG. 6(B)).

If $\Delta\theta<E$, the process proceeds to step S43, at which the excessive angle $\theta 1$ is determined as $\theta 1=\Delta\theta+E$, and the return angle $\theta 2$ is determined as $\theta 2=E+E+E'$, and a rotation command of a return-type rotational pattern P3, by which the instrument body 52 is first rotated by the excessive angle $\theta 1$, is then reversed by the return angle $\theta 2$, and is rotated in the first direction, is formed (see FIG. 6(C)).

After determining the rotational patterns P1, P2, and P3 in this way, the process proceeds to step S27, and steps subsequent to this step are carried out in the same way as in the second embodiment shown in FIG. 4.

In this embodiment, $\Delta\theta\pm E\pm E'$, which is the error range of $\Delta\theta$, is covered swiftly and reliably so as to reduce mistakes in catching the target 60. Therefore, in this embodiment, working efficiency can be more excellently raised than in the second embodiment.

The present invention is not limited to the embodiments described above. For example, various modifications can be carried out as follows.

In the above embodiments, the rotational direction is determined by the central processing unit 80 which is a rotation command means provided on the side of the target 60. However, it is permissible to transmit measured direction angles $\theta A$ and $\theta B$ from the side of the target 60 to the side of the surveying instrument 50 and determine the rotational direction by the central processing unit 100 which is a rotation means provided on the side of the surveying instrument 50. Likewise, the same effect as in the above embodiments can be fulfilled in this case.

In the above embodiments, a low-cost magnetic sensor is used as the azimuth angle sensor 86. However, any sensor can be used as the azimuth angle sensor 86 if the sensor is a direction-angle detectable sensor such as a gyro that always maintains a constant posture or a wireless direction-finder that detects the incoming direction of radio waves emitted from a fixed radio source like a broadcasting station.

In the above embodiments, the direction angle is obtained and stored at step S24 (see FIG. 3 and FIG. 5). However, the direction angle may be obtained and stored at any step between the start and step S25.

In the above embodiments, the guide light 64 shaped like a fan beam is emitted from the target 60 while scanning. However, a beam of guide light 64 that is simple diffused light may be emitted.

In the first embodiment, only the rotational direction of the instrument body 52 is indicated from the target 60 to the surveying instrument 50. However, it is permissible to also transmit an angular difference $\Delta\theta=\theta B-\theta A$ serving as the rotation angle from the target 60 to the surveying instrument 50 and stop the instrument body 52 when the instrument body 52 is directed approximately toward the target 60. In this case, the instrument body 52 is never rotated excessively, and the time taken until the automatic collimation is more swiftly completed can be shortened.

DESCRIPTION OF THE SYMBOLS

50 Surveying instrument
52 Instrument body
60 Target
64 Guide light
66 Guide light transmitter
80 Central processing unit (rotation command means)
86 Azimuth angle sensor
100 Central processing unit (rotation means)
$\Delta\theta$ Angular difference between a direction angle obtained at the present time and a direction angle obtained at the last time
$\theta 1$ Excessive angle
$\theta 2$ Return angle
E Maximum estimated error angle
E' Safe error angle

The invention claimed is:

1. A survey system comprising a target and a surveying instrument provided with an automatic collimator that automatically collimates the target,
   the target comprising a guide light transmitter that emits guide light; an azimuth angle sensor that detects a direction angle at which the target is directed; and a rotation command means for sending a rotation command to the surveying instrument,
   the surveying instrument comprising a rotation means for directing a body of the surveying instrument toward the target by receiving the guide light when the rotation command is received,
   wherein the rotation command means or the rotation means determines a rotational direction of the body of the surveying instrument based on an angular difference between a direction angle obtained when the target is caused to substantially exactly face the surveying instrument at the last measurement and a direction angle obtained when the target is caused to substantially exactly face the surveying instrument at the present measurement.

2. The survey system as described in claim 1, wherein the rotation command means or the rotation means determines the rotation angle of the body of the surveying instrument to be the angular difference.

3. The survey system as described in claim 1, wherein the rotation command means or the rotation means rotates the body of the surveying instrument in a rotational direction determined based on the angular difference if the angular difference is greater than a maximum estimated error angle of the azimuth angle sensor, and
   the rotation command means or the rotation means determines an excessive angle that is greater by the maximum estimated error angle than the angular difference, then rotates the body of the surveying instrument by the excessive angle, and reverses the body of the surveying instrument if the angular difference of the direction angle is smaller than the maximum estimated error angle.

4. The survey system as described in claim 1, wherein if an angular difference of the direction angle is greater than the sum of the maximum estimated error angle of the azimuth angle sensor and a safe error angle obtained by affording a margin for the error angle, the rotation command means or the rotation means rotates the body of the surveying instrument in a rotational direction determined based on the angular difference, and
   if the angular difference of the direction angle is greater than the maximum estimated error angle and is smaller than the sum of the maximum estimated error angle and the safe error angle, the rotation command means or the rotation means determines an excessive angle greater by the sum of the maximum estimated error angle and the safe error angle than the angular difference, then rotates the body of the surveying instrument by the excessive angle, and reverses the body of the surveying instrument, and
   if the angular difference of the direction angle is smaller than the maximum estimated error angle, the rotation command means or the rotation means determines an excessive angle greater by the maximum estimated error angle than the angular difference and a return angle equal to the sum of twice the maximum estimated error angle and the safe error angle, then rotates the body of the surveying instrument by the excessive angle, then reverses the body of the surveying instrument by the return angle, and again rotates the body of the surveying instrument in the direction determined first.

5. The survey system as described in any one of claims 1, 2, 3, and 4, wherein the azimuth angle sensor is a magnetic sensor.

* * * * *